United States Patent [19]

Ishizaki

[11] Patent Number: 5,418,415
[45] Date of Patent: May 23, 1995

[54] RELUCTANCE MOTOR AND GENERATOR

[76] Inventor: Akira Ishizaki, No. 22-5, Nagatakita 3-chome, Minami-ku, Yokohama-shi, Kanagawa, Japan

[21] Appl. No.: 205,392

[22] Filed: Mar. 3, 1994

[30] Foreign Application Priority Data

Mar. 4, 1993 [JP] Japan .................. 5-043412

[51] Int. Cl.⁶ ............................ H02K 19/00
[52] U.S. Cl. .................. 310/162; 310/168; 310/261; 310/269; 318/701
[58] Field of Search ............ 310/166, 269, 162, 163, 310/164, 168, 106, 261, 254; 318/701

[56] References Cited

U.S. PATENT DOCUMENTS

| | | | |
|---|---|---|---|
| 529,918 | 11/1894 | Kelly | 318/701 |
| 3,686,553 | 8/1972 | Broadway | 318/701 X |
| 3,956,678 | 5/1976 | Byrne | 310/168 |
| 3,995,203 | 11/1976 | Torok | 310/163 |
| 4,475,051 | 10/1984 | Chai | 310/162 |
| 5,281,903 | 1/1994 | Oku | 318/701 |
| 5,289,107 | 2/1994 | Radun | 318/701 |
| 5,327,069 | 7/1994 | Radun | 318/701 |

*Primary Examiner*—R. Skudy
*Attorney, Agent, or Firm*—Wenderoth, Lind & Ponack

[57] ABSTRACT

Inexpensive, maintenance-free and high efficiency reluctance motors and generators have a construction that makes it possible to decrease pulsating torque and additional harmonic core loses. Each salient pole of the rotor core of the reluctance motor and generator has a shape such that the gap permeance varies in proportion to $\cos(N\theta_2)$, where $\theta_2$ represents an angular position with respect to the origin set to the center of a salient pole, or a shape analogous to the shape. In order to make up for a reduction of reluctance torque due to the shape, slits are provided inside the rotor core which cause a large reluctance for the quadrature-axis flux without interfering with the direct-axis flux.

4 Claims, 3 Drawing Sheets

FIG.3
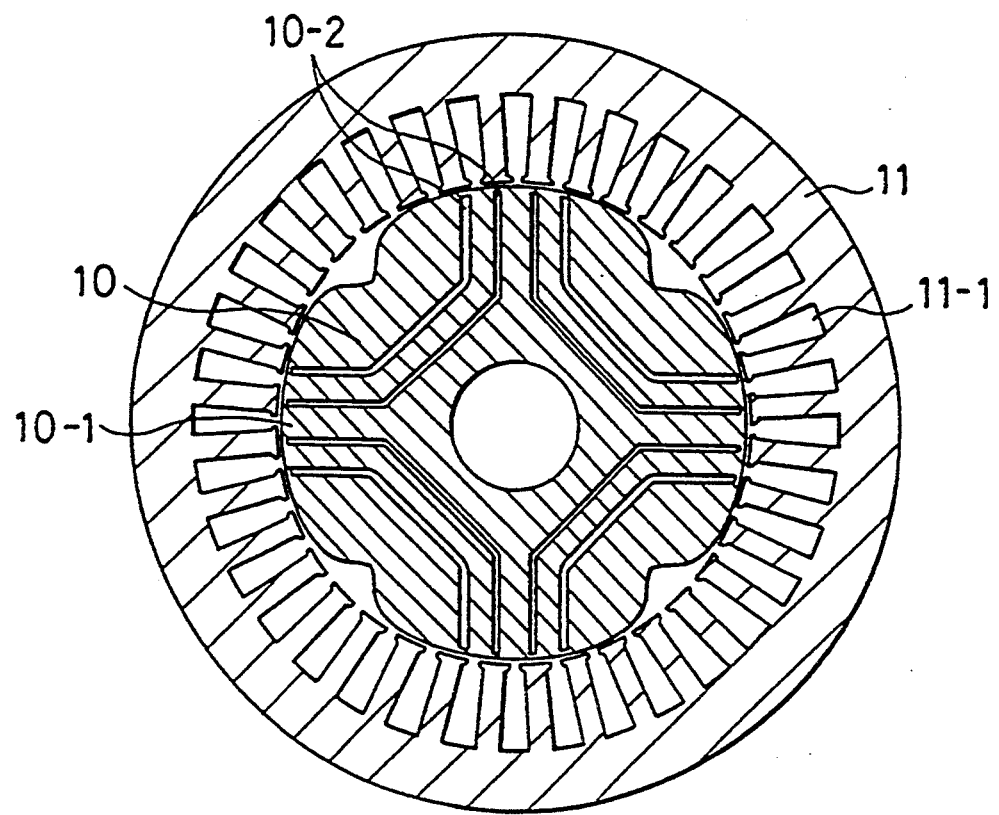
PRIOR ART    FIG.4
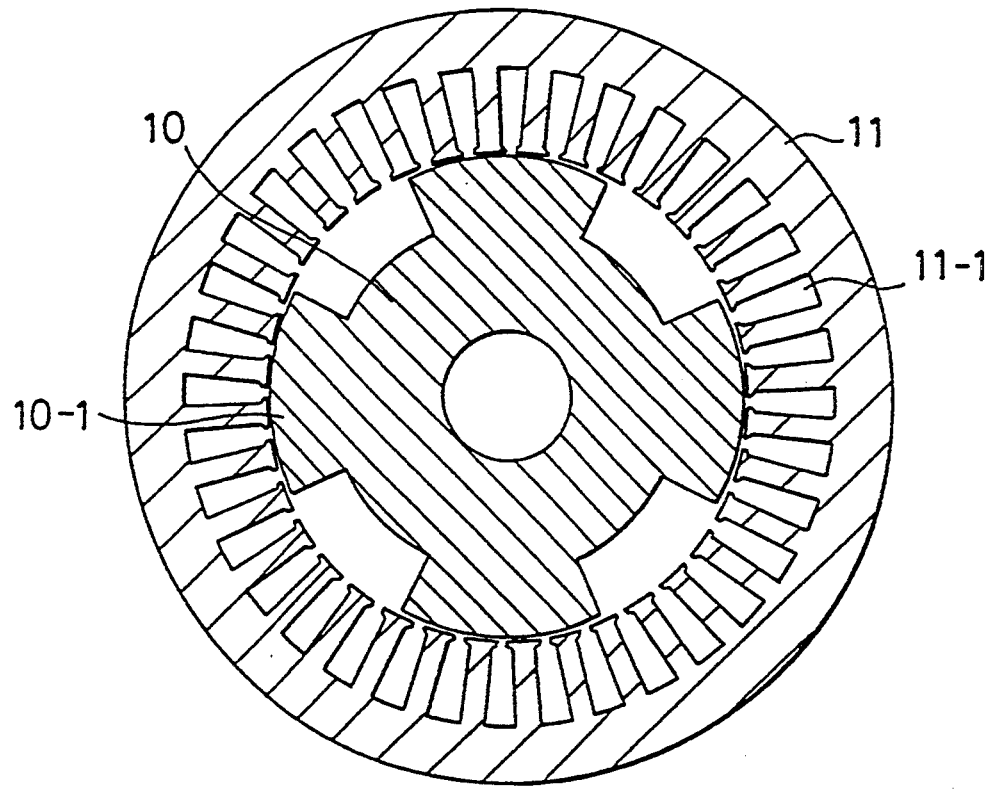

| ORDER \ MODEL | A | B | C |
|---|---|---|---|
| FUNDAMENTAL | 100.0 | 100.0 | 100.0 |
| 3 | 51.9 | 38.8 | 26.1 |
| 5 | 8.4 | 6.6 | 5.7 |
| 7 | 18 5 | 3.4 | 4.7 |

RELUCTANCE MOTOR AND GENERATOR

BACKGROUND OF THE INVENTION

The present invention relates to synchronous reluctance motors and generators having a simple and maintenance-free construction which can be widely used in various industrial fields. Although the present invention includes not only motors, but also generators, the following explanation will be focused on the motors, because motors are far more widely used than generators.

Reluctance motors with a simple rotor construction having no winding thereon have the merits of being maintenance-free and, moreover, have a high efficiency because no copper loss is generated in the rotor. However, reluctance motors generate pulsating torques due to the harmonic components contained in the air-gap flux, and these harmonic flux densities also produce additional core losses which reduce the efficiency.

Therefore, it is a most important problem in reluctance motors and generators in how to decrease the pulsating torques and harmonic core losses. The object of the present invention is to provide inexpensive and maintenance-free reluctance motors and generators which can be driven with high efficiency and good stability by solving the problems stated above.

SUMMARY OF THE INVENTION

Harmonic components contained in the air-gap flux, due to the salient poles of the rotor core, whose magnitudes vary depending on their shape, are a primary factor in the generation of pulsating torques and additional core losses. Therefore, in order to minimize these harmonic flux densities the present invention is characterized by an outer surface shape of a rotor core such that the fluctuation part of the normalized gap permeance, which means the gap permeance per unit area, due to the salient poles varies in proportion to $\cos(N\theta_2)$, where N is the number of salient poles and $\theta_2$ represents the angular position of a point in the air gap with respect to the origin on the rotor, the center of a salient pole, and by a shape that is analogous to the above mentioned shape.

Considering a case where the salient pole shape stated above was used in reluctance motors, the difference between the direct-axis armature reaction inductance and the quadrature-axis armature reaction inductance becomes smaller, and so the maximum torque decreases compared with the case of a conventional salient pole shape. Therefore, to improve the maximum torque while keeping the harmonic contents in the air-gap flux smaller, the present invention provides slits inside the above mentioned rotor core which causes a large reluctance for the quadrature-axis flux without interfering with the direct-axis flux.

Hereafter, the principle of the present invention will be explained for a reluctance synchronous motor. Neglecting the saturation of the core and the fluctuation of the gap permeance due to the stator slot openings, the normalized gap permeance for a 2p pole reluctance motor is represented by the following expression (1)

$$P_{00} + \sum_{n=1}^{\infty} P_{0n}\cos(2np\theta_2) \qquad (1)$$

where n is an arbitrary positive integer, p is a number of pole pairs, $P_{00}$ designates the permeance coefficient for the mean air-gap length, and $P_{0n}$ designate the permeance coefficient for the component varying with the cosine function of $(2np\theta_2)$ depending on the angular position $\theta_2$.

The steady torque of the synchrouous reluctance motor produced by the armature current I is represented by the following expression (2)

$$T = \frac{3p}{2}(L_d - L_q)I^2\sin(2p\phi) = 2K_T(P_{d1} - P_{q1})I^2\sin(2p\phi) \qquad (2)$$

where the symbols used in the equation mean the following:

- $L_d$ and $L_q$ are synchronous inductances for the direct-axis, and quadrature-axis respectively;
- $\phi$ is the space angle between the position of peak value of the magnetomotive force by the aramture current and the center of salient pole, and hereafter called the MMF phase angle;
- $K_T$ is a constant determined by design data such as the main motor dimensions and number of stator windings;
- $P_{d1}$ and $P_{q1}$ are the respective normalized gap permeances for the direct-axis and quadrature-axis fundamental fluxes.

It is theoretically deduced that the following equation (3) holds between $P_{d1}$, $P_{q1}$ and $P_{01}$ $$P_{d1} - P_{q1} = \frac{1}{2}P_{01} \qquad (3)$$

Therefore, the torque of reluctance motor can also be expressed by the following equation (4) by substituting equation (3) into equation (2)

$$T = K_T P_{01} I^2 \sin(2p\phi) \qquad (4)$$

This expression shows that the permeance coefficient $P_{01}$ only contributes to the generation of the effective reluctance torque. And it has been made clear by a theoretical study that $P_{0n}$ corresponding to n greater than 2 causes the harmonic flux densities which produce pulsating torques and additional core losses. Therefore, the salient pole shape that makes the normalized gap permeance shown by the following equation (5)

$$P_{00} + P_{01}\cos(2p\theta_2) \qquad (5)$$

is desirable in order to minimize these harmful harmonic components in the air-gap flux densities. This is the principle of the present invention.

Although the salient pole shape stated above can minimize pulsating torques and additional losses, the value of $P_{01}$ also decreases in this case compared with the conventional pole shape, resulting in a decrease of the maximum value of the reluctance torque. Therefore, in order to increase the value of $P_{01}$ it has been devised in the present invention to provides slits inside the rotor core which cause a large reluctance for the quadrature-axis flux without interfering with the direct-axis flux. As the variation of $P_{0n}$ corresponding to n greater than 2 caused by these slits is not so large, the combination of the salient pole shape and slits inside the rotor core makes it possible to increase the maximum value of the reluctance torque and minimize harmful harmonic flux densities.

BRIEF DESCRIPTION OF THE DRAWINGS

The above and other object, features, and advantages of the present invention will become more apparent from the following detailed description with reference to the drawings, in which:

FIG.3 is a cross-sectional view of stator and rotor cores showing an example of a rotor core having double slits in accordance with the present invention;

FIG.4 is a cross-sectional view of stator and rotor cores of a conventional reluctance motor;

DETAILED DESCRIPTION OF THE PREFERRED EMBODIMENT

Referring from FIG.1 to FIG.5 and FIG.6, the present invention will be explained in detail using a preferred example of a embodiment of the present invention.

Figure 1:
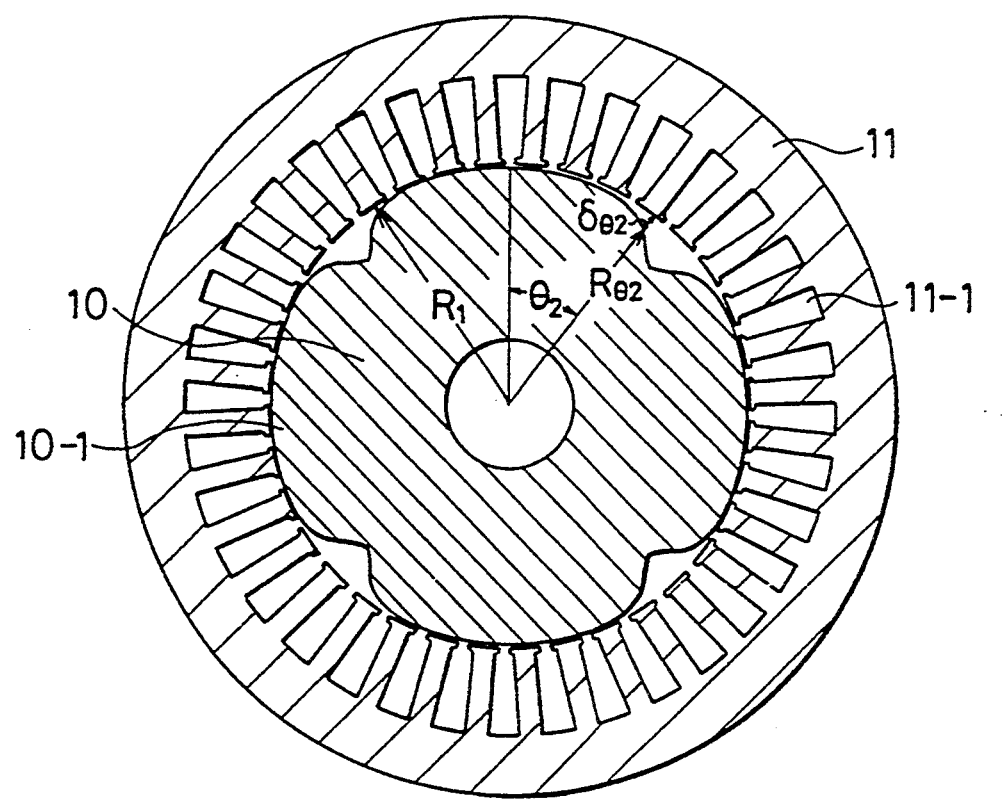
FIG. 1 is a cross-sectional view of stator and rotor cores showing an example of the present invention.

FIG.1 is a cross-sectional view of cores of a 4 pole reluctance motor showing an example of the embodiment of the present invention. A rotor core 10 is shown with a salient pole 10-1 and a stator core 11 formed with many slots 11-1 in its inner periphery. Three phase windings (not shown) are wound, in the slots 11-1.

FIG. 4 shows a cross-sectional view of an example of cores of a conventional reluctance motor to compare with the present invention. It can be easily supposed that the normalized gap permeance expression (1) in the case of FIG.4 contains $P_{0n}$ corresponding to n greater than 2 because of the squarish shape of the salient pole.

Therefore, the shape of a salient pole that does not include $P_{0n}$ corresponding to n greater than 2 in the normalized gap permeance equation (1) has been devised by the following consideration. Neglecting the fluctuation of gap permeance due to stator slots and the saturation of cores, the normalized gap permeance can be represented by $\mu_0/\delta_{\theta 2}$, where $\mu_0$ is the permeability of a vacuum and $\mu_{\theta 2}$ is the air-gap length at an angular position $\theta_2$ as shown in FIG. 1. As the equation (5) also shows the desirable normalized gap permeance, the following equation can be obtained by equating both $$\frac{\mu_0}{\delta_{\theta 2}} = P_{00} + P_{01}\cos(2p\theta_2) \quad (6)$$

The following equation (7) showing $\delta_{\theta 2}$ necessary to obtain the desirable normalized gap permeance is deduced from equation (6).

$$\delta_{\theta 2} = \frac{\mu_0}{P_{00} + P_{01}\cos(2p\theta_2)} \quad (7)$$

Designating the air-gap length at the point $\theta_2=(2h-1)\pi/4p$ as $\delta_0$ where h represents an integer from 1 to 2p, $P_{00}$ is represented by the following equation (8) by instituting tile relationship $\cos(2p\theta_2)=0$ that holds at these points into equation (7).

$$P_{00} = \frac{\mu_0}{\delta_0} \quad (8)$$

On the other hand it is clear from the equation (7) that the air-gap length at the point $\theta_2=(h-1)\pi/p$ takes the minimum value since the relation $\cos(2p\theta_2)=1$ holds at these points. Designating this minimum air-gap length as $\delta_1$, the following equation is obtained from equation (7)

$$\delta_1 = \frac{\mu_0}{P_{00} + P_{01}} \quad (9)$$

From equations (8) and (9), $P_{01}$ is represented by the following equation $$P_{01} = P_{00}\left(\frac{\delta_0}{\delta_1} - 1\right). \quad (10)$$

Substituting equations (8) and (10) into equation (7), we can obtain the following equation (11) showing the air gap length $\delta_{\theta 2}$ at a point $\theta_2$ necessary to realize the desirable normalized gap permeance shown by the equation (5).

$$\delta_{\theta 2} = \frac{\delta_0}{1 + \left(\frac{\delta_0}{\delta_1} - 1\right)\cos(2p\theta_2)}. \quad (11)$$

Therefore, we can determine the air-gap length at a point of the coordinates $\theta_2$ from the equation (11) by giving the value of $\delta_0$ and $\delta_0/\delta_1$, where the value of $\delta_0/\delta_1$ must be less than 2 to keep the value of $\delta_{\theta 2}$ positive.

The desirable shape of rotor outer surface can be determined by taking $R_{\theta 2}$, the distance between a point of the coordinates $\theta_2$ on the outer surface and the center of the rotor, as the following equation:

$$R_{\theta 2} = R_1 - \frac{\delta_0}{1 + \left(\frac{\delta_0}{\delta_1} - 1\right)\cos(2p\theta_2)}, \quad (12)$$

where $R_1$ is the radius of the inner surface of the stator core. Equation (12) is calculated by substracting the air-gap length from the radius of the inner surface of the stator core, as shown in FIG. 1.

A cross-sectional view of cores of a 4 pole reluctance motor having the rotor outer surface shape calculated by the equation (12) is shown in FIG. 1. Comparing the salient pole shape of FIG. 1 with that of FIG. 4 showing the rotor shape of the conventional reluctance motor, it is easily supposed that the difference between the direct-axis gap permeance $P_{d1}$ and the quadrature-axis gap permeance $P_{q1}$ is larger in the conventional rotor, and so the maximum reluctance torque of the motor with the former pole shape becomes smaller than that with the latter.

Figure 2:
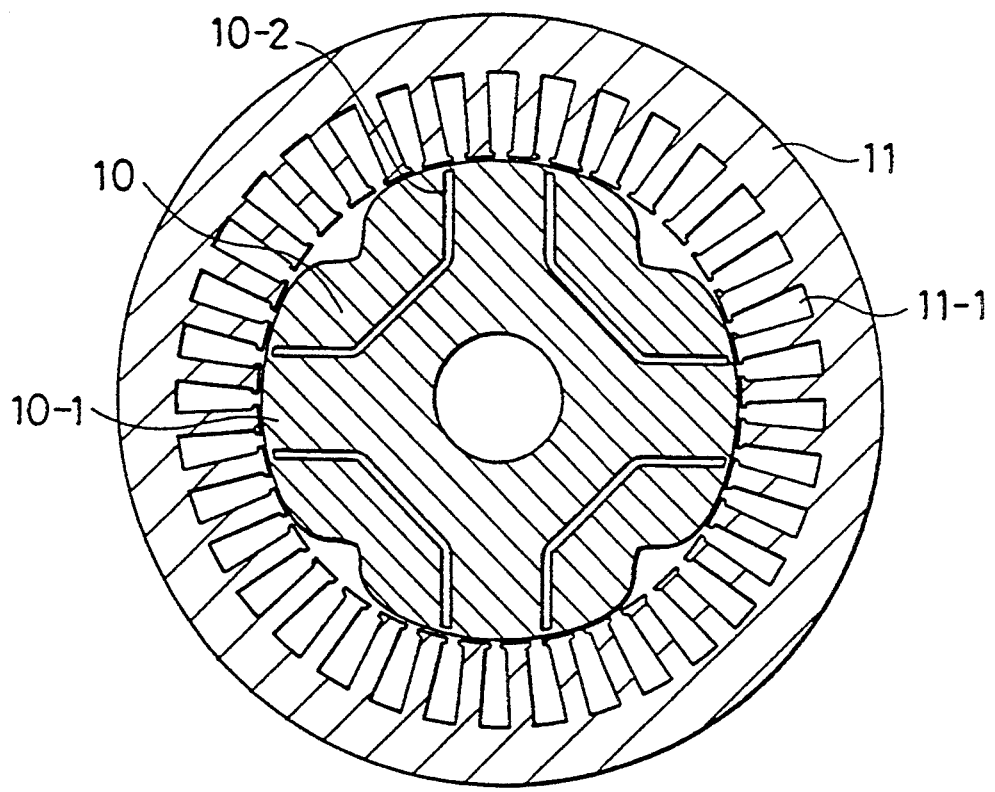
FIG. 2 is a cross-sectional view of stator and rotor cores showing an example of a rotor core having slits in accordance with the present invention.

Therefore, in order to increase the maximum reluctance torque of the motor with the pole shape shown in FIG. 1 it has been devised in the present invention to provide slits 10-2 inside the rotor core as shown in FIG. 2 and FIG. 3. As these slits give a large reluctance for the quadrature-axis flux without interfering with the direct-axis flux, they enlarge the difference between $P_{d1}$ and $P_{q1}$, resulting in an increase of the maximum reluctance torque compared with the case of FIG. 1. Although tile slits have a little effect upon the gap flux distribution, the harmonic contents are mainly determined by the variation of air-gap length depending on the position, and so are decreased in this case too as compared with the conventional pole shape.

Since the equation (12) is derived under the assumption that the all flux lines run radially in the air gap, there may be the case where the value of $P_{0n}$ corresponding to n greater than 2 remains keeping some harmful magnitude, so the harmonic contents do not decrease evidently. In such a case, the correction of the salient pole shape by optimization using the results of magnetic field analysis such as by the finite element method to minimize $P_{0n}$ corresponding to n greater than 2 will make possible the reduction of the harmonic contents.

Figures 5, 6:
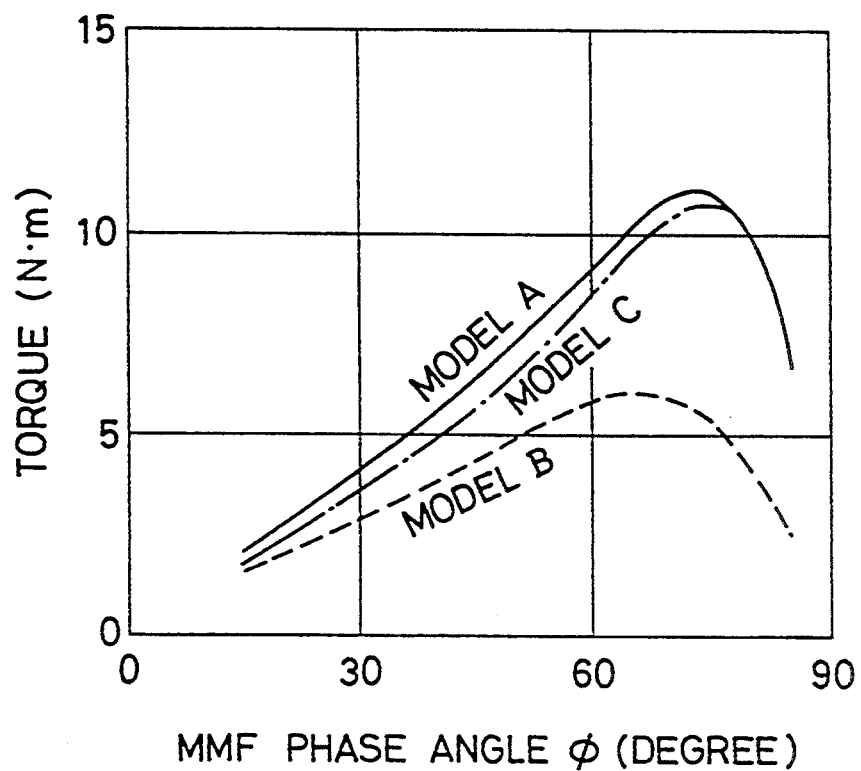
Fig.5 is a diagram showing a comparison of the torque between the present invention and the conventional reluctance motor.
Fig.6 is a table showing the comparison of harmonic contents between the present invention and the conventional reluctance motor.

The numerical examples for the comparison between the present invention and the conventional reluctance motor are shown in FIG. 5 and FIG. 6. In these figures the model A corresponds to the conventional reluctance motor with the cores shown in FIG. 4, the model B corresponds to the present invention with the salient pole shape shown in FIG. 1 and the model C also to the present invention with the rotor core having the slits inside as shown in FIG. 2. FIG. 5 shows the reluctance torque versus the MMF phase angle $\phi$. The comparison of the maximum torque among these three models shows that model B has a decrease torque but model C has nearly the same torque as that of model A.

FIG. 6 shows the comparison of harmonic contents at running condition, from which we can see that the models B and C have less harmonic contents compared with the model A. It is evident from these numerical examples that the present invention makes it possible to reduce the harmful harmonic flux densities keeping equal maximum torque as compared with the conventional reluctance motor.

Although the explanation described above has been done for the inner rotor type of reluctance motor, the present invention can of course also be applied to the construction of outer rotor and generator.

Reluctance motors and generators have 9 simple rotor construction having no windings, and so have the merits of being inexpensive, maintenance-free and have a high efficiency because of generating no copper loss in the rotor. However, the conventional machines have the demerits of pulsating torques and additional core losses due to the harmonic components in the air-gap flux.

As described above, the present invention can decrease the pulsating torques and additional core losses inherent in the conventional reluctance motors and generators by optimizing the shape of the outer rotor surface and make up for the decrease of the reluctance torque due to the optimized salient pole shape by providing slits inside the rotor core to have the same or more rated torque as the conventional machines.

Therefore, the present invention makes it possible to realize inexpensive, maintenance-free and high efficiency rotating electric machines which have a simple construction and are driven smoothly without fluctuations of torque or speed, and so contribute the development of industry.

What is claimed is:

1. A synchronous reluctance motor comprising:
   a stator comprising a laminated steel core having a plurality of slots formed therein and windings wound in said slots for the flow of alternating current; and
   a rotor comprising a plurality of thin magnetic laminations, said rotor having N salient poles, wherein N is an arbitrary integer, said salient poles failing to have windings disposed thereon;
   wherein said salient poles have a shape analogous to a curvature, referenced to an opposing surface of said core of said stator, that is expressed by the equation $$\delta_{\theta 2} = \delta_0 / \{1 + (\delta_0/\delta_1 - 1) \cos(2p\theta_2)\}$$

wherein
   $\theta_2$ is a coordinate of an angular position with respect to a minimum air gap point between one of said N salient poles and said opposing said stator core,
   $\delta_{\theta 2}$ is an air gap length at a point $\theta_2$,
   p is a number of pole-pairs,
   $\delta_1$ is a minimum air gap length, and
   $\delta_0$ is a mean air gap length.

2. The synchronous reluctance motor of claim 1, wherein said rotor has a plurality of slits disposed therein providing a high reluctance for quadrature-axis fluxes without interfering with direct-axis fluxes.

3. A synchronous reluctance generator comprising:
   a stator comprising a laminated steel core having a plurality of slots formed therein and windings wound in said slots for the flow of alternating current; and
   a rotor comprising a plurality of thin magnetic laminations, said rotor having N salient poles, wherein N is an arbitrary integer, said salient poles failing to have windings disposed thereon;
   wherein said salient poles have a shape analogous to a curvature, referenced to an opposing surface of said core of said stator, that is expressed by the equation $$\delta_{\theta 2} = \delta_0 / \{1 + (\delta_0/\delta_1 - 1) \cos(2p\theta_2)\}$$

wherein:
   $\theta_2$ is a coordinate of an angular position with respect to a minimum air gap point between one of said N salient poles and said opposing surface of said stator core,
   $\delta_{\theta 2}$ is an air gap length at a point $\theta 2$,
   p is a number of pole-pairs,
   $\delta_1$ is a minimum air gap length, and
   $\delta_0$ is a mean air gap length.

4. The synchronous reluctance generator of claim 3, wherein said rotor has a plurality of slits disposed therein providing a high reluctance for quadrature-axis fluxes without interfering with direct-axis fluxes.

* * * * *